United States Patent
Thelen et al.

(10) Patent No.: US 9,024,654 B2
(45) Date of Patent: May 5, 2015

(54) SYSTEM AND METHOD TO ACTIVELY DRIVE THE COMMON MODE VOLTAGE OF A RECEIVER TERMINATION NETWORK

(75) Inventors: Robert Thelen, Fort Collins, CO (US); Michael Farmer, Fort Collins, CO (US); Jade Kizer, Windsor, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 243 days.

(21) Appl. No.: 13/615,802

(22) Filed: Sep. 14, 2012

(65) Prior Publication Data
US 2014/0079106 A1    Mar. 20, 2014

(51) Int. Cl.
*H03K 19/003* (2006.01)
*H04L 25/02* (2006.01)

(52) U.S. Cl.
CPC .................................. *H04L 25/0276* (2013.01)

(58) Field of Classification Search
None
See application file for complete search history.

(56) References Cited

U.S. PATENT DOCUMENTS

| | | | |
|---|---|---|---|
| 6,188,271 B1* | 2/2001 | Wang et al. | 327/545 |
| 6,700,823 B1 | 3/2004 | Rahman et al. | |
| 6,766,155 B2 | 7/2004 | Salcido et al. | |
| 6,792,062 B2* | 9/2004 | Vaucher | 375/374 |
| 7,180,950 B2* | 2/2007 | Engel et al. | 375/257 |
| 7,358,869 B1 | 4/2008 | Chiarulli et al. | |
| 8,279,976 B2* | 10/2012 | Lin et al. | 375/316 |
| 2005/0253622 A1* | 11/2005 | Dreps et al. | 326/31 |
| 2006/0119380 A1 | 6/2006 | Gonzalez | |
| 2007/0163815 A1* | 7/2007 | Ungaretti et al. | 178/18.06 |
| 2007/0290712 A1* | 12/2007 | Gomez et al. | 326/30 |
| 2014/0035696 A1* | 2/2014 | Ali et al. | 333/32 |

\* cited by examiner

*Primary Examiner* — Jany Richardson (57) ABSTRACT

An active termination circuit for a differential receiver includes a first receiver element configured to receive a first component of a differential signal, a second receiver element configured to receive a second component of a differential signal, a common mode measurement element configured to receive the differential signal and generate a transmit common mode signal (Vcm) representing an average value of the differential signal, and a receiver (RX) common mode signal node. The termination circuit also comprises an active element configured to receive the transmit common mode signal (Vcm) and provide an output to the receiver common mode signal node, the output configured to drive the value of the signal at the receiver common mode signal node to the value of the transmit common mode signal (Vcm), and a capacitive element coupled to the receiver common mode signal node in parallel with the active element.

21 Claims, 9 Drawing Sheets

SYSTEM AND METHOD TO ACTIVELY DRIVE THE COMMON MODE VOLTAGE OF A RECEIVER TERMINATION NETWORK

BACKGROUND

A modern application specific integrated circuit (ASIC) must meet very stringent design and performance specifications. One example of an ASIC is a circuit element referred to as a serializer/deserializer (SERDES). As its name implies, a SERDES converts a parallel bit stream to a high speed serial bit stream, transmits it across a channel, then the serial bit stream is converted back to a parallel bit stream. A typical SERDES is organized into blocks of transmitters and receivers having digital to analog conversion (DAC) functionality and analog to digital conversion (ADC) functionality. Normally, the receivers and transmitters operate on differential signals. Differential signals are those that are represented by two complementary signals on different conductors, with the term "differential" representing the difference between the two complementary signals. All differential signals also have what is referred to as a "common mode," which represents the average of the two differential signals. High-speed differential signaling offers many advantages, such as low noise and low power while providing a robust and high-speed data transmission.

Typically, it is desirable that high-speed differential input/output circuits (also referred to as input/output buffers, receiver/transmitter circuits, or receiver/driver circuits) use some form of differential and common mode termination (e.g., a resistive load) to match the differential impedance of the transmission medium (or channel). The transmission medium (e.g., printed-circuit board traces, transmission lines, backplanes, a differential wire pair, or cables) couples the output circuit to the input circuit and provides a path along which the intended information travels.

Because the receivers only respond to differential voltages, common mode modulation is generally rejected by the receivers. However, common mode signals may create certain problems with differential signaling systems. For example, the common mode signals, if not terminated, may consume a large portion of a receiver's finite common mode voltage range or, if the common mode signal is driven into resonance, exceed the common mode range of the receiver. Common mode signals may interfere with or degrade the communication of the desired information.

Figure 1:
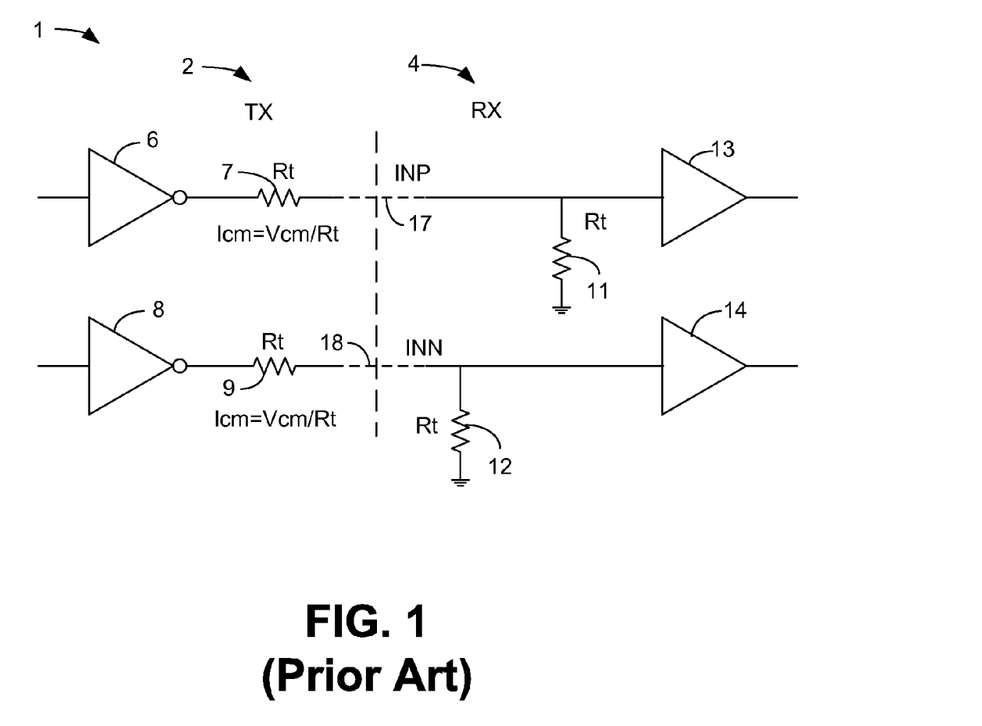
FIG. 1 is a schematic diagram illustrating a conventional transmit driver and receiver termination network.

FIG. 1 is a schematic diagram illustrating a conventional transmit driver and receiver termination network. The network 1 comprises a transmit (TX) portion 2 and a receive (RX) portion 4 connected by a transmission medium 17 and 18. The transmit portion 2 comprises a transmit driver 6 and a transmit driver 8. The transmit drivers 6 and 8 deliver a differential transmit signal to resistors 7 and 9, respectively. The DC current through each resistor is given by Icm=Vcm/Rt, where Icm is the common mode transmit current, Vcm is the common mode voltage of the differential signals, and Rt is the value of the resistors 7 and 9.

The signal INP is the positive transmit signal, also referred to as an input signal, provided to a receiver 13. The signal INN is the negative transmit signal, also referred to as an input signal, provided to a receiver 14. The terms "positive" and "negative" are relative because the signals INP and INN represent the components of a differential signal that exist around the common mode voltage, Vcm. The signals INP and INN may have the same polarity or may have different polarity. A receiver termination resistor 11 and a receiver termination resistor 12 terminate the INP and INN signals, respectively, to circuit ground. The values of the resistors 11 and 12 are chosen to represent the impedance of the transmission medium 17 and 18, respectively, which is shown in dotted line to indicate that the transmit portion 2 is separated from the receive portion 4 by a distance. In an embodiment, the value of each resistor 11 and 12 is nominally 50 ohms.

Figure 2:
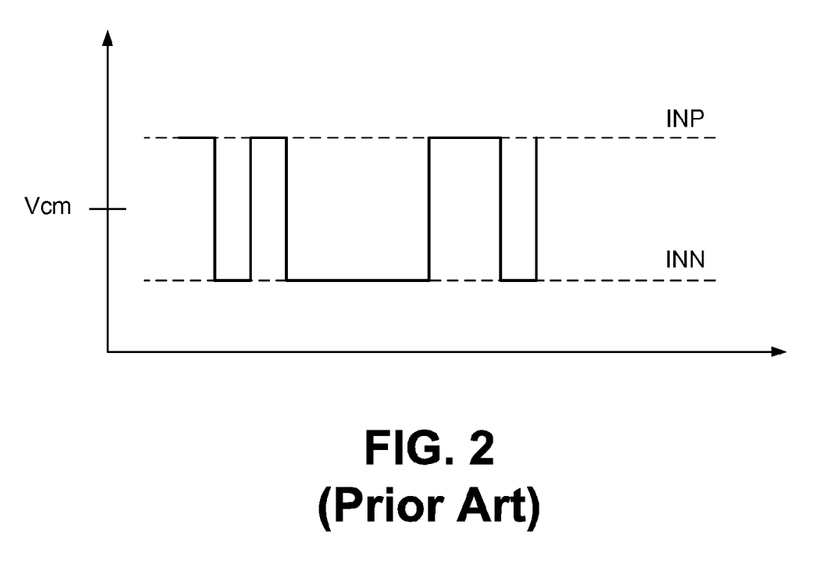
FIG. 2 is a diagram illustrating an output signal of the transmitter drivers of FIG. 1.

FIG. 2 is a diagram illustrating an output signal of the transmitter drivers of FIG. 1. The output signal from the transmit drivers 6 and 8 is one where the common mode voltage is Vcm and is measured at the receiver inputs as:

$$VCM = \frac{INN + INP}{2} \qquad \text{Eq. 1}$$

A non-zero common mode voltage, for the network 1 (FIG. 1), generates DC current and DC power. Because hundreds of transmit and receiver channels are integrated into a typical integrated circuit, it is desirable to minimize this power. For the example transmit and receiver circuit shown in FIG. 1, Vcm is typically 0.25 volts resulting in 10 mWatts of power assuming a 1 volt supply.

Figure 3:
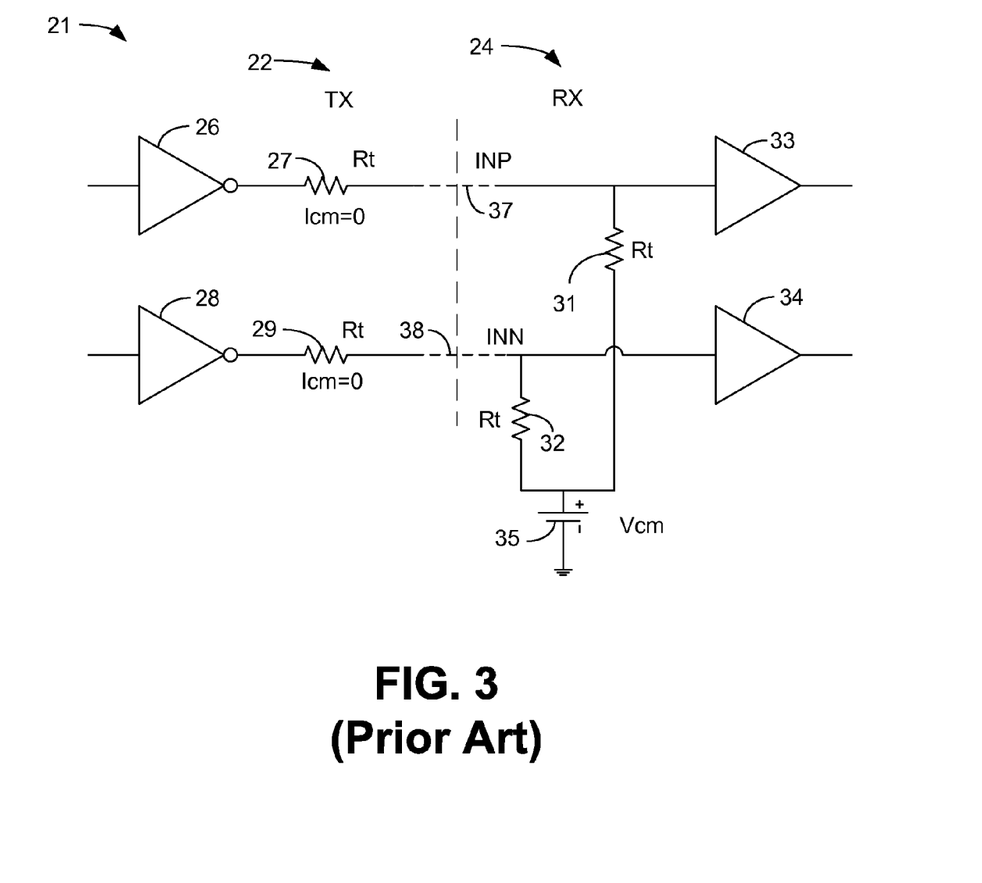
FIG. 3 is a schematic diagram illustrating a conventional transmit driver and receiver termination network that minimizes DC power.

FIG. 3 is a schematic diagram illustrating a conventional transmit driver and receiver termination network that minimizes DC power. The network 21 comprises a transmit (TX) portion 22 and a receive (RX) portion 24 connected by a transmission medium 37 and 38. The transmit portion 22 comprises a transmit driver 26 and a transmit driver 28. The transmit drivers 26 and 28 deliver a differential transmit signal to resistors 27 and 29, respectively. The DC current through each resistor 27 and 29 is shown as Icm=0 to reflect that there is ideally zero (0) DC current in the resistors 27 and 29 because, as will be described below, there is ideally zero (0) DC current flowing in the resistors 31 and 32.

The signal INP is provided to a receiver 33. The signal INN is provided to a receiver 34. A receiver termination resistor 31 and a receiver termination resistor 32 terminate the INP and INN signals, respectively, to a voltage source 35, which is illustrated as a DC voltage source at the common mode voltage, Vcm. The values of the resistors 31 and 32 are chosen to represent the impedance of the transmission medium 37 and 38, respectively, which is shown in dotted line to indicate that the transmit portion 22 is separated from the receive portion 24 by a distance. In an embodiment, the value of each resistor 31 and 32 is nominally 50 ohms. The network 21 solves the excessive power problem of the network 1 by disconnecting the receiver termination from ground and connecting it to a voltage source having the value, Vcm. With the receiver common node at Vcm, the DC current through the receiver termination resistors 31 and 32 is zero and the DC power is zero. Unfortunately, a voltage source 35 is difficult to implement in a cost-effective manner.

Figure 4:
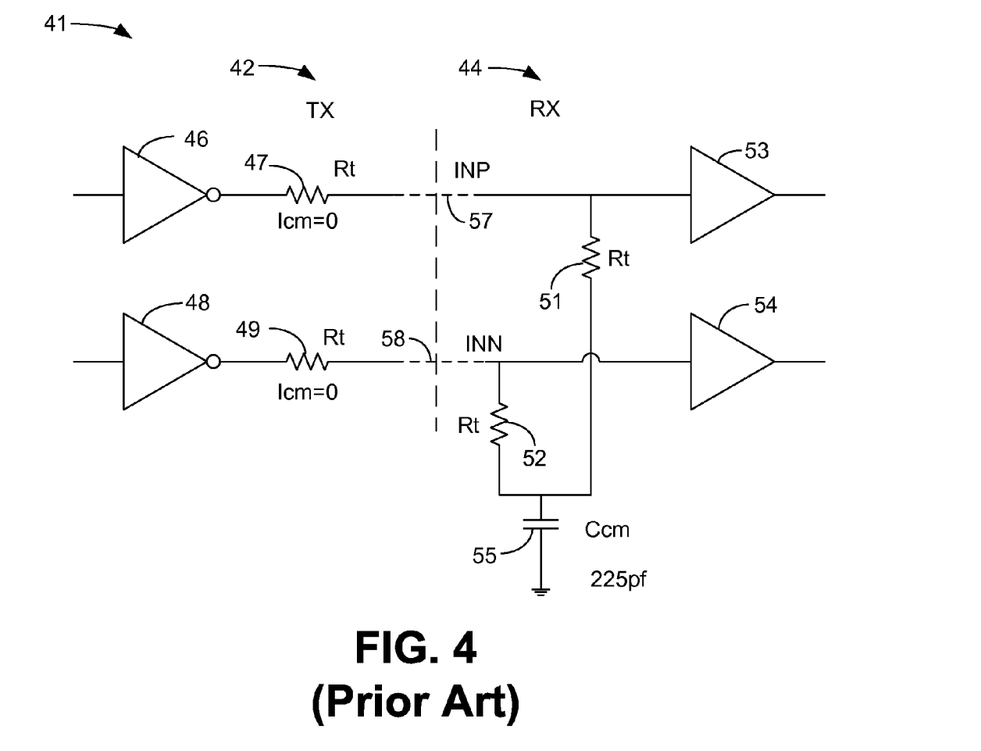
FIG. 4 is a schematic diagram illustrating a conventional transmit driver and receiver termination network that implements the network of FIG. 3.

FIG. 4 is a schematic diagram illustrating a conventional transmit driver and receiver termination network that implements the network 21 of FIG. 3. The network 41 comprises a transmit (TX) portion 42 and a receive (RX) portion 44 connected by a transmission medium 57 and 58. The transmit portion 42 comprises a transmit driver 46 and a transmit driver 48. The transmit drivers 46 and 48 deliver a differential transmit signal to resistors 47 and 49, respectively. The DC current through each resistor 47 and 49 is shown as Icm=0 to reflect that there is ideally zero (0) DC current in the resistors 51 and 52 because, as will be described below, there is ideally zero (0) DC current flowing in the resistors 51 and 52.

The signal INP is provided to a receiver 53. The signal INN is provided to a receiver 54. A receiver termination resistor 51 and a receiver termination resistor 52 terminate the INP and INN signals, respectively, to a capacitor 55. The capacitor 55 represents a simple implementation of the voltage source 35 of FIG. 3. The values of the resistors 51 and 52 are chosen to represent the impedance of the transmission medium 57 and 58, respectively, which is shown in dotted line to indicate that the transmit portion 42 is separated from the receive portion 44 by a distance. In an embodiment, the value of each resistor 51 and 52 is nominally 50 ohms Replacing the Vcm voltage source 35 (FIG. 3) with the capacitor 55 (common mode capacitance (Ccm)) also solves the excessive power problem, but at the expense of common mode return loss.

Receiver common mode return loss is given by:

$$CM\_RT = -20 \cdot \log\left(\frac{Z_{receiver} - 25}{Z_{receiver} + 25}\right) \quad \text{Eq. 2}$$

Figure 5:
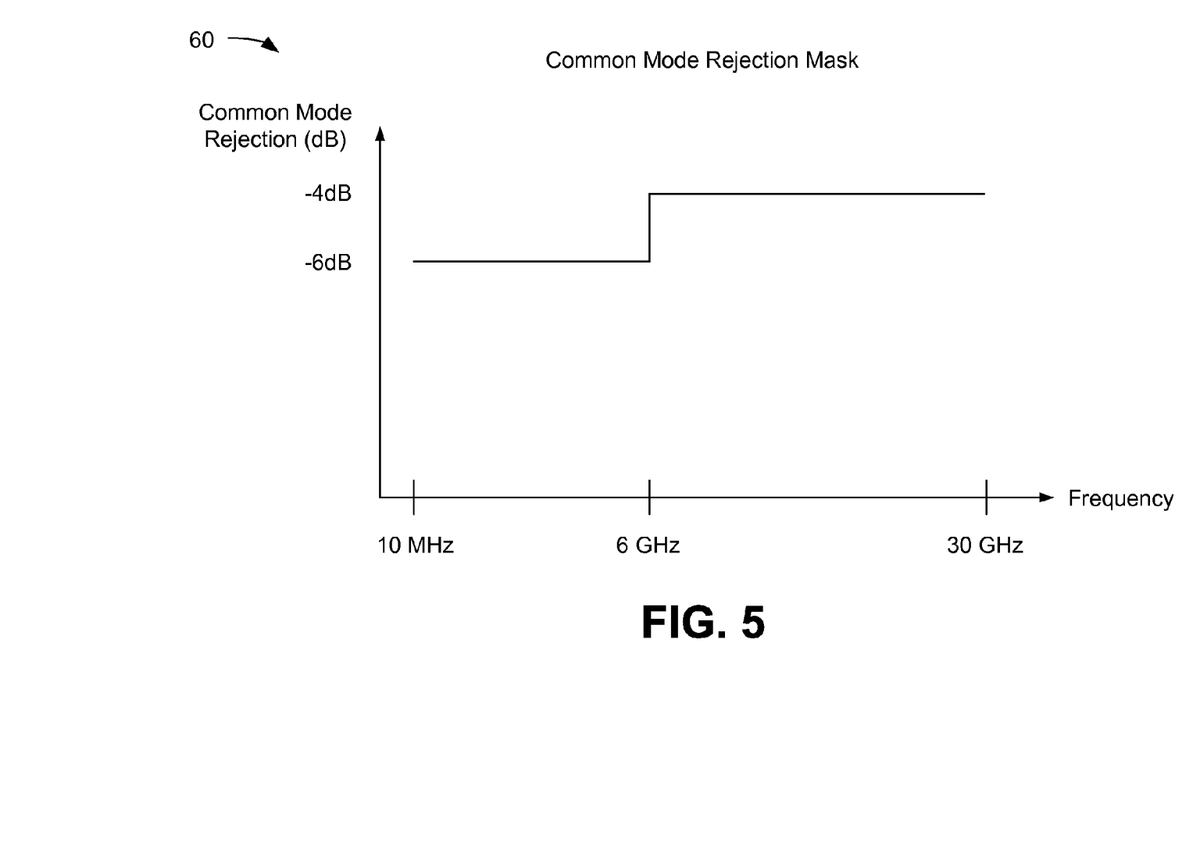
FIG. 5 is a diagram illustrating a typical receiver return loss mask.

FIG. 5 is a diagram 60 illustrating a typical receiver return loss mask (receiver return loss). To pass a typical common mode return loss mask, the impedance of the capacitor 55 at 10 MHz should be less than 50 ohms. This dictates a capacitor in excess of 225 pf, which is difficult to economically integrate into the termination network 41 due to large size. Further, integrating such a large capacitor also causes leakage and introduces a variety of manufacturing difficulties.

Accordingly, a receiver termination network that overcomes these shortcomings is needed.

SUMMARY

In an embodiment, an active termination circuit for a differential receiver comprises a first receiver element configured to receive a first component of a differential signal, a second receiver element configured to receive a second component of a differential signal, a common mode measurement element configured to receive the differential signal and generate a transmit common mode signal (Vcm) representing an average value of the differential signal, and a receiver (RX) common mode signal node. The termination circuit also comprises an active element configured to receive the transmit common mode signal (Vcm) and provide an output to the receiver common mode signal node, the output configured to drive the value of the signal at the receiver common mode signal node to the value of the transmit common mode signal (Vcm), and a capacitive element coupled to the receiver common mode signal node in parallel with the active element.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

An active receiver termination network can be implemented in a SERDES or in another circuit that employs differential signaling to minimize or eliminate DC power at a differential receiver, while also minimizing return loss.

Figure 6:
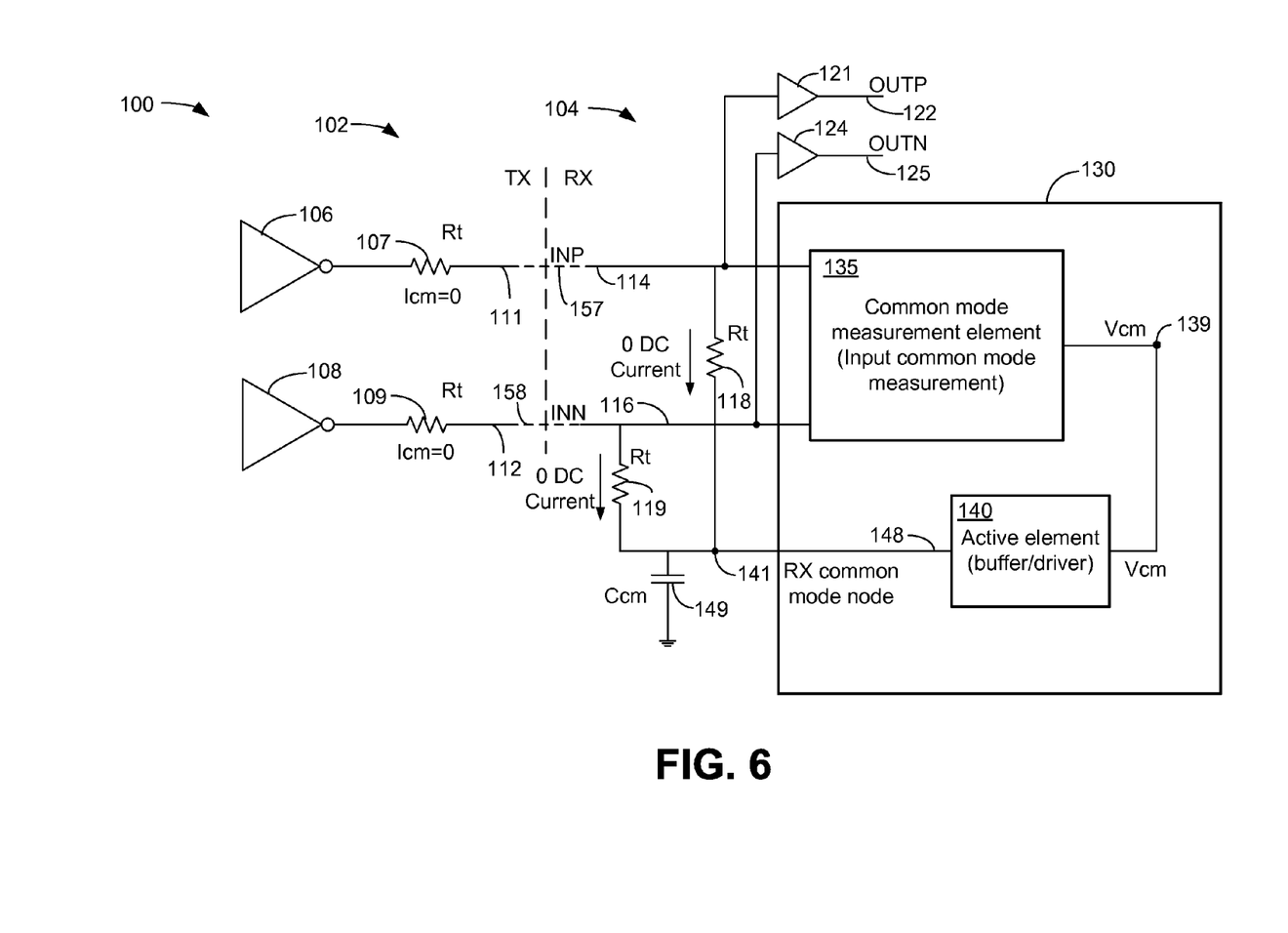
FIG. 6 is a schematic diagram illustrating an embodiment of an active receiver termination network.

FIG. 6 is a schematic diagram illustrating an embodiment of an active receiver termination network. The network 100 comprises a transmit (TX) portion 102 and a receive (RX) portion 104 connected by a transmission medium 157 and 158. The transmit portion 102 comprises a transmit driver 106 and a transmit driver 108. The transmit drivers 106 and 108 deliver a differential transmit signal to resistors 107 and 109, respectively. The resistors 107 and 109 provide their differential outputs, INP and INN over connections 111 and 112, respectively. The DC current through each resistor is shown as Icm=0 to reflect that there is ideally zero (0) DC current in the resistors 107 and 109 because, as will be described below, there is ideally zero (0) DC current flowing in the resistors 118 and 119.

The signal INP is the positive transmit signal, also referred to as an input signal, that is provided to a receiver 121. The signal INN is the negative transmit signal, also referred to as an input signal that is provided to a receiver 124. The terms "positive" and "negative" are relative because the signals INP and INN represent the components of a differential signal that exist around the common mode voltage, Vcm. The signals INP and INN may have the same polarity or may have different polarity. In this embodiment, the differential signals INP and INN have different polarity. A receiver termination resistor 118 and a receiver termination resistor 119 terminate the INP and INN signals, respectively, and create a receive (RX) common mode signal between them at node 141. The signal on node 141 represents the common mode of the signals INP and INN across the resistors 118 and 119, respectively.

A capacitive element 149, referred to as a common mode capacitance (Ccm), couples the (RX) common mode signal node 141 to ground. In an embodiment, the capacitive element 149 can have a value of about 40-50 pf, and in an embodiment, can have a value of about 45 pf. The values of the resistors 118 and 119 are chosen to represent the impedance of the transmission medium 157 and 158, respectively, which is shown in dotted line to indicate that the transmit portion 102 is separated from the receive portion 104 by a distance. In an embodiment, the value of each resistor 118 and 119 is nominally 50 ohms.

The circuit 100 also comprises an active feedback circuit 130, which includes a common mode measurement element 135 and an active element 140. The common mode measurement element 135 can comprise passive or active elements, or a combination of these. The common mode measurement element 135 extracts the transmitter common mode voltage Vcm from the INP and INN differential signals on connections 114 and 116, and provides the transmitter common mode voltage Vcm on node 139.

The active feedback circuit 130 also comprises an active element 140 coupled to the (TX) common mode voltage (Vcm) node 139 and coupled to the (RX) common mode signal node 141.

In an embodiment, the output of the active element 140 on connection 148 comprises a buffered version of the Vcm signal from node 139, which drives the (RX) common mode signal node 141 to the value of Vcm on the (TX) common mode voltage node 139. When the (RX) common mode signal node 141 approaches and ideally equals the (TX) common mode voltage (Vcm) node 139, the DC current through the receiver termination resistors 118 and 119 approaches and ideally equals zero, thus reducing the DC power on connections 114 and 116 to zero. Zero DC power at the resistors 118 and 119, effectively eliminates DC power at the transmit resistors 107 and 109, thereby allowing Icm=0.

Implementing the active element 140 as a low power element in parallel with the capacitive element 149 (Ccm) allows the receiver to pass a common mode rejection mask, such as the mask shown in FIG. 5 with small values of the capacitive element 149. In an embodiment, the low power active element 140 consumes less than about 2 mA and allows the circuit 100 to provide about −6 dB of common mode rejection at frequencies below about 200 MHz. The capacitive element 149 (Ccm) provides about −6 dB of common mode rejection at frequencies above about 200 MHz. Other amounts of common mode rejection are possible, depending on application, return loss mask, and component choice.

Figure 7:
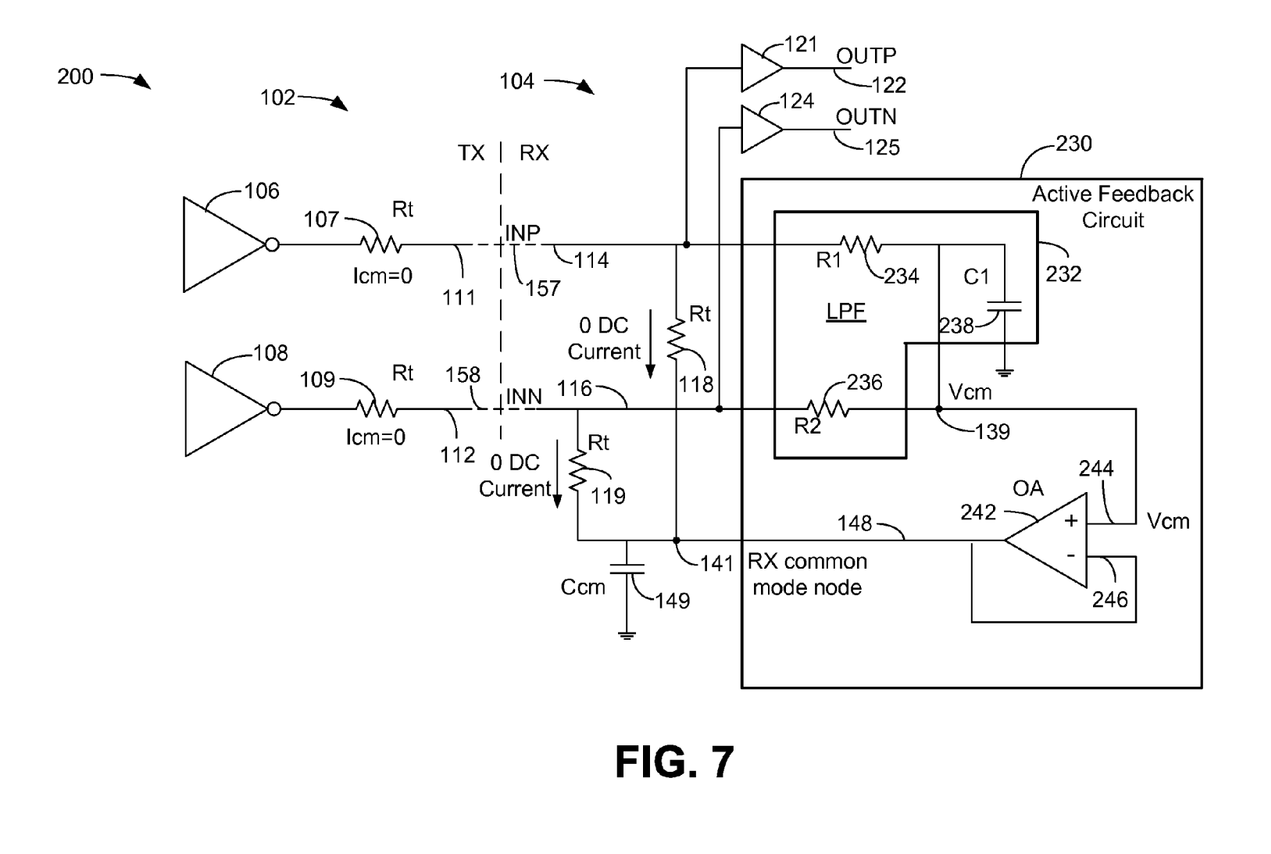
FIG. 7 is a schematic diagram illustrating an alternative embodiment of the active receiver termination network of FIG. 6.

FIG. 7 is a schematic diagram illustrating an alternative embodiment of the active receiver termination network of FIG. 6. Elements in FIG. 7 that are identical to corresponding elements in FIG. 6 are identically numbered and are not necessarily described again in detail. The network 200 comprises the transmit (TX) portion 102 and the receive (RX) portion 104 connected by a transmission medium 157 and 158.

The circuit 200 also comprises an active feedback circuit 230, which includes a filter 232 and an active element 242. In an embodiment, the filter 232 is a low pass filter (LPF) and comprises a resistor 234 (R1), a resistor 236 (R2) and a capacitor 238 (C1). In an embodiment, the resistor 234 (R1) has an example value of 50K ohms, the resistor 236 (R2) has an example value of 50K ohms, and the capacitor 238 (C1) has an example value of 5 pf. Other embodiments of a filter and other filter implementations are possible for the filter 232. The resistors 234 (R1) and 236 (R2) extract the transmitter common mode voltage Vcm, and the capacitor 238 (C1) creates a low pass filter which is used to remove high frequency common mode energy. The filter 232 provides a (TX) common mode voltage (Vcm) node 139 at which the transmit (TX) common mode voltage (Vcm) appears.

The active feedback circuit 230 also comprises an active element 242 coupled to the (TX) common mode voltage (Vcm) node 139 and coupled to the (RX) common mode signal node 141. In an embodiment, the active element 242 is an operational amplifier having a non-inverting input 244 connected to the (TX) common mode voltage (Vcm) node 139 and an inverting input 246 connected to the operational amplifier's output on connection 148, which is also coupled to the (RX) common mode signal node 141. Desirable characteristics of the active element 242 include the ability to provide a rail to rail input, a rail to rail output, provide low power with a high bandwidth, and preferably include a class AB output stage.

The output of the active element 242 on connection 148 comprises a buffered version of the Vcm signal from node 139, which drives the (RX) common mode signal node 141 to the value of Vcm on the (TX) common mode voltage node 139. When the (RX) common mode signal node 141 approaches and ideally equals the (TX) common mode voltage (Vcm) node 139, the DC current through the receiver termination resistors 118 and 119 approaches and ideally equals zero, thus reducing the DC power on connections 114 and 116 to zero. Zero DC power at the resistors 118 and 119, effectively eliminates DC power at the transmit resistors 107 and 109, thereby allowing Icm=0.

Implementing the active element 242 as a low power amplifier in parallel with the capacitive element 149 (Ccm) allows the receiver to pass a common mode rejection mask, such as the mask shown in FIG. 5 with small values of the capacitive element 149. The low power active element 242 consumes less than about 2 mA and allows the circuit 200 to provide about −6 dB of common mode rejection at frequencies below about 200 MHz. The capacitive element 149 (Ccm) provides about −6 dB of common mode rejection at frequencies above about 200 MHz. Other amounts of common mode rejection are possible, depending on application, return loss mask and component choice.

Figure 8:
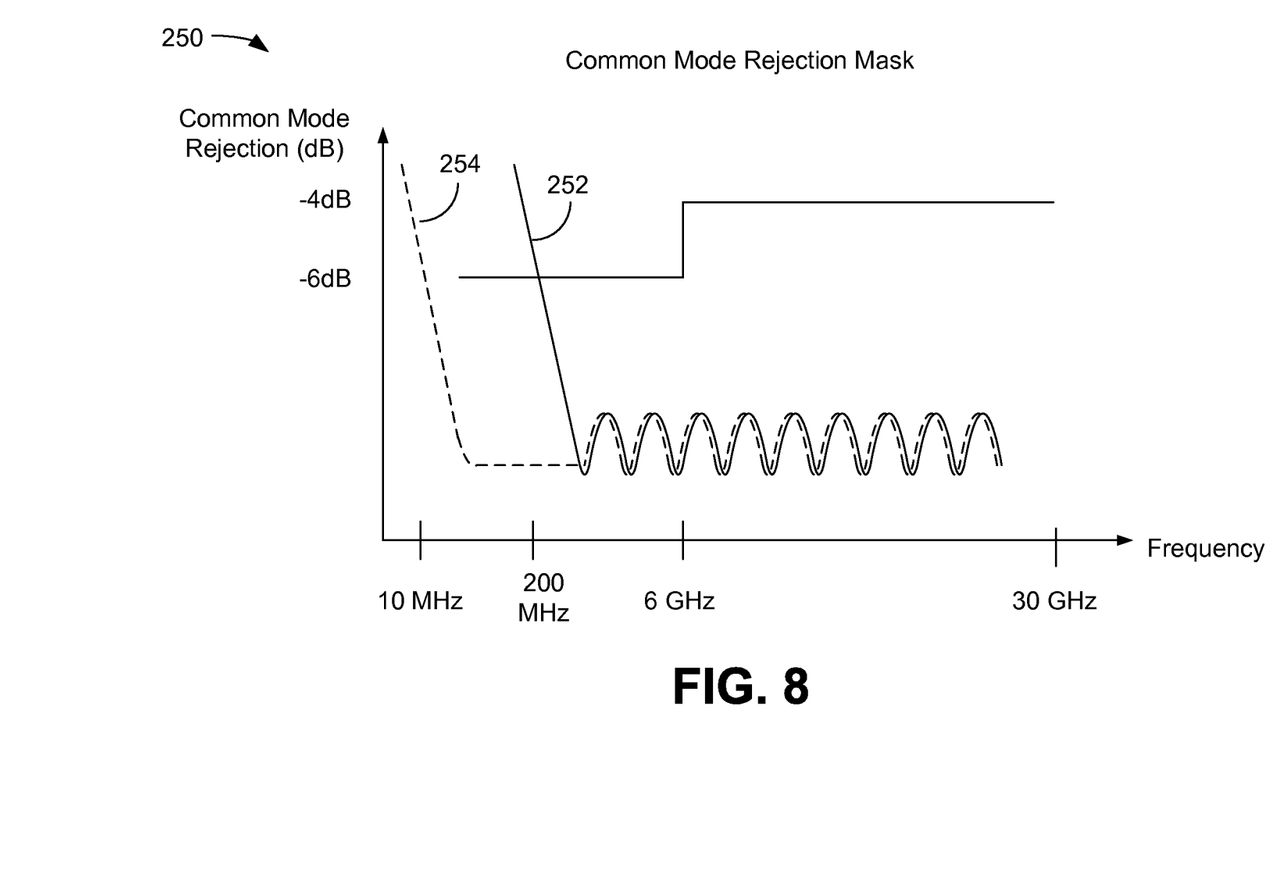
FIG. 8 is a graphical illustration showing the return loss performance of the receiver termination network overlaid on the receiver return loss mask of FIG. 5.

FIG. 8 is a graphical illustration 250 showing the return loss performance of the receiver termination network overlaid on the receiver return loss mask of FIG. 5. The trace 252 shows the return loss performance relative to 200 MHz when only the capacitive element 149 (Ccm) is used. The trace 254 shows the return loss performance relative to 200 MHz when the active element 140 is located in parallel with the capacitive element 149 (Ccm). The active element 140 allows the circuit 100 and the circuit 200 to provide about −6 dB of common mode rejection at frequencies below about 200 MHz. The capacitive element 149 (Ccm) provides about −6 dB of common mode rejection at frequencies above about 200 MHz.

Figure 9:
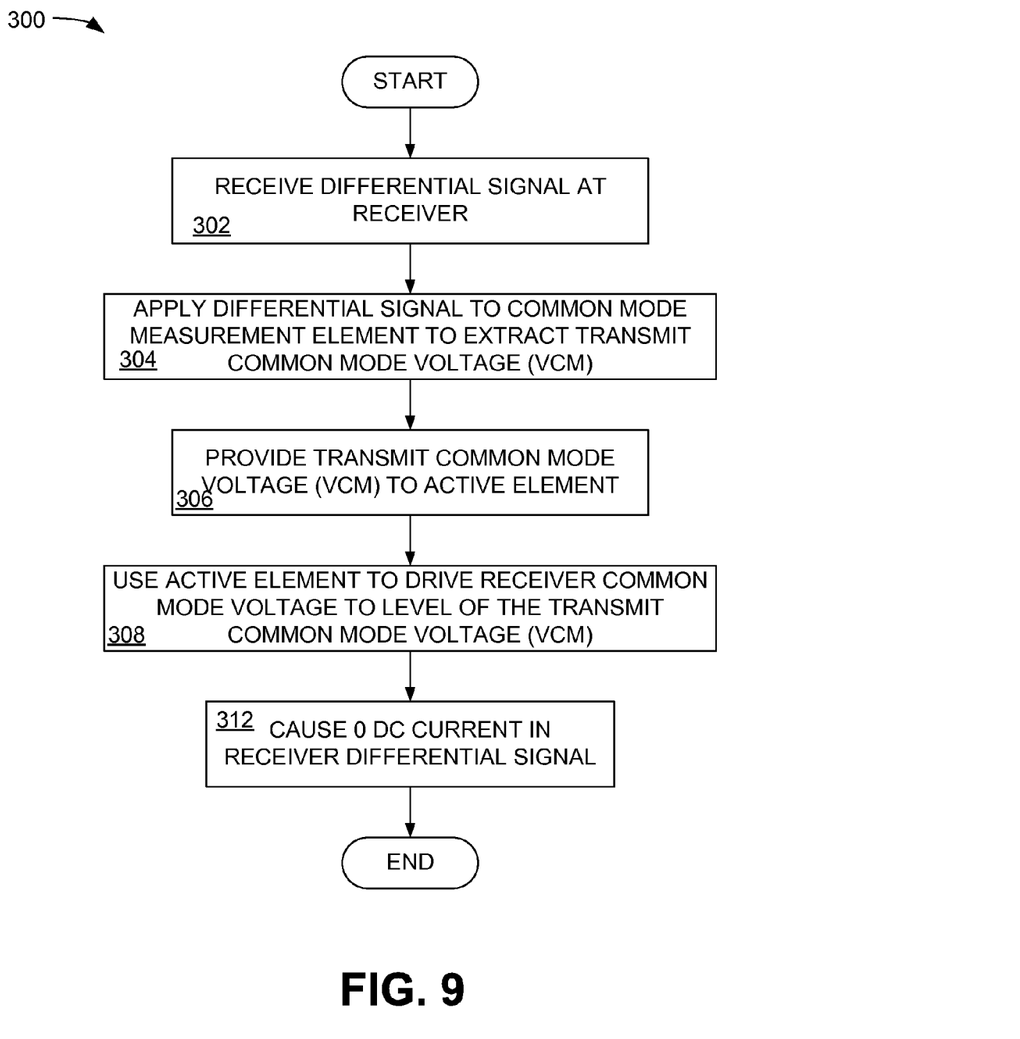
FIG. 9 is a flow chart describing an embodiment of a method for operating a circuit having an active receiver termination network.

FIG. 9 is a flow chart describing an embodiment of a method for operating a circuit having an active receiver termination network. In block 302, a differential signal is received at a receiver. The differential signal can be provided to the receiver elements 121 and 124 (FIG. 6 and FIG. 7).

In block 304, the differential signal is applied to the common mode measurement element 135 (FIG. 6) to extract the transmit (TX) common mode signal (Vcm). In an embodiment, the differential signal is low pass filtered to generate the transmit (TX) common mode signal (Vcm) representing an average value of the differential signal at the receiver 104.

In block 306, the (TX) common mode signal (Vcm) is provided to an active element 140. In an embodiment, the active element 140 can be any amplifier, buffer, or other active element, and in an embodiment, can be the operational amplifier 242 (FIG. 7). The active element 242 buffers the transmit common mode signal (Vcm).

In block 308, the output of the active element 242 is provided to the (RX) common mode signal node 141. The buffered transmit common mode signal (Vcm) at the output of the active element 242 drives the value of the signal at the receiver common mode signal node 141 to the value of the signal at the transmit common voltage node 139.

In block 312, when the value of the (RX) common mode signal node 141 approaches and ideally reaches the value of the transmit common mode signal (Vcm), the current flowing in the resistors 118 and 119 goes toward, and eventually reaches, zero, thus reducing the DC power at connections 114 and 116 to zero. Zero DC power at the resistors 118 and 119, effectively eliminates DC power at the transmit resistors 107 and 109, thereby allowing Icm=0.

This disclosure describes the invention in detail using illustrative embodiments. However, it is to be understood that the invention defined by the appended claims is not limited to the precise embodiments described.

What is claimed is:

1. An active termination circuit for a differential receiver, comprising:
   a first receiver element configured to receive a first component of a differential signal;
   a second receiver element configured to receive a second component of the differential signal;
   a common mode measurement element configured to receive the differential signal and generate a transmit common mode signal representing an average value of the differential signal;
   a receiver common mode signal node;
   an active element configured to receive the transmit common mode signal and provide an output to the receiver common mode signal node, the output configured to drive the value of the signal at the receiver common mode signal node to the value of the transmit common mode signal; and
   a capacitive element coupled to the receiver common mode signal node in parallel with the active element.

2. The circuit of claim 1, further comprising:
   a first resistor coupled to a first component of the differential signal; and
   a second resistor coupled to a second component of the differential signal, wherein the output of the active element causes a current in the first resistor and the second resistor to approach zero.

3. The circuit of claim 1, wherein the common mode measurement element is a low pass filter and the active element is an operational amplifier.

4. The circuit of claim 3, wherein the operational amplifier is a low power device that allows the circuit to provide about −6 dB of common mode rejection at frequencies below about 200 MHz.

5. The circuit of claim 3, wherein the capacitive element is a capacitor that allows the circuit to provide about −6 dB of common mode rejection at frequencies above about 200 MHz.

6. The circuit of claim 3, wherein the operational amplifier provides a buffered version of the transmit common mode signal to drive the value of the signal at the receiver common mode signal node to the value of the transmit common mode signal.

7. The circuit of claim 6, wherein when a value of the receiver common mode signal node is driven toward a value of the transmit common mode signal, direct current through receiver termination resistors approaches zero.

8. The circuit of claim 3, wherein the operational amplifier is located in parallel with the capacitive element.

9. A method for operating a circuit, comprising:
   receiving a differential signal in a receiver;
   measuring the received differential signal to generate a transmit common mode signal representing an average value of the differential signal;
   buffering the transmit common mode signal;
   providing the buffered transmit common mode signal to a receiver common mode signal node, the buffered transmit common mode signal configured to drive the value of a signal at the receiver common mode signal node to the value of the transmit common mode signal; and
   capacitively coupling the receiver common mode signal node to ground.

10. The method of claim 9, further comprising:
    coupling a first resistor to a first component of the differential signal; and
    coupling a second resistor to a second component of the differential signal, wherein the buffered transmit common mode signal causes a current in the first resistor and the second resistor to approach zero.

11. The method of claim 9, wherein the measuring comprises low pass filtering and the buffering comprises using an operational amplifier.

12. The method of claim 11, wherein the operational amplifier is a low power device that provides about −6 dB of common mode rejection at frequencies below about 200 MHz.

13. The method of claim 11, wherein the capacitive coupling provides about −6 dB of common mode rejection at frequencies above about 200 MHz.

14. The method of claim 13, further comprising providing a buffered version of the transmit common mode signal to drive the value of the signal at the receiver common mode signal node to the value of the transmit common mode signal.

15. The method of claim 14, wherein when a value of the receiver common mode signal node is driven toward a value of the transmit common mode signal, direct current through receiver termination resistors approaches zero.

16. The method of claim 11, further comprising locating the operational amplifier in parallel with a receive common mode capacitance.

17. A receiver for a serializer/deserializer (SERDES), comprising:
    a first receiver element configured to receive a first component of a differential signal;
    a second receiver element configured to receive a second component of the differential signal;
    a common mode measurement element configured to receive the differential signal and generate a transmit common mode signal representing an average value of the differential signal;
    a receiver common mode signal node;
    an active element configured to receive the transmit common mode signal and provide an output to the receiver common mode signal node, the output configured to drive the value of the signal at the receiver common mode signal node to the value of the transmit common mode signal; and
    a capacitive element coupled to the receiver common mode signal node in parallel with the active element.

18. The receiver of claim 17, further comprising:
    first resistor coupled to a first component of the differential signal; and
    a second resistor coupled to a second component of the differential signal, wherein the output of the active element causes a current in the first resistor and the second resistor to approach zero.

19. The receiver of claim 17 wherein the common mode measurement element is a low pass filter and the active element is an operational amplifier.

20. The receiver of claim 19, wherein the operational amplifier is a low power device that allows the circuit to provide about −6 dB of common mode rejection at frequencies below about 200 MHz.

21. The receiver of claim 19, wherein the capacitive element is a capacitor that allows the circuit to provide about −6 dB of common mode rejection at frequencies above about 200 MHz.

* * * * *